Nov. 21, 1944. H. L. GRIFFIN 2,362,997
METHOD FOR TESTING FILLED CONTAINERS
Filed May 9, 1940 5 Sheets-Sheet 1

INVENTOR.
Harry L. Griffin
BY
Mock + Blum
ATTORNEYS

Nov. 21, 1944.  H. L. GRIFFIN  2,362,997
METHOD FOR TESTING FILLED CONTAINERS
Filed May 9, 1940  5 Sheets-Sheet 2

INVENTOR.
Harry L. Griffin
BY
Mock & Blum
ATTORNEYS

Nov. 21, 1944.   H. L. GRIFFIN   2,362,997
METHOD FOR TESTING FILLED CONTAINERS
Filed May 9, 1940   5 Sheets-Sheet 5

INVENTOR.
Harry L. Griffin
BY Mock + Blum

ATTORNEYS

Patented Nov. 21, 1944

2,362,997

UNITED STATES PATENT OFFICE 2,362,997

METHOD FOR TESTING FILLED CONTAINERS

Harry L. Griffin, Rockville Centre, N. Y., assignor to Nestle's Milk Products, Inc., New York, N. Y., a corporation of New York Application May 9, 1940, Serial No. 334,104

3 Claims. (Cl. 73—52)

My invention relates to testing filled containers, in order to check the respective weights of the respective fillings of said containers. The containers may be cans, bottles, jars and of any form or shape. The filling material may be of any kind. The materials may be evaporated milk, sweetened or unsweetened, paints, oils, and powdered or solid or liquid material of any kind. Likewise, the cans or other containers may be completely filled or they may be incompletely filled.

A principal object of the invention is to test the correctness of the filling of the container, while the container is held fixed in a cradle which is mounted to turn about a horizontal axis. When I refer to a cradle, I include weights which may be fixed to or which may be adjustably connected to the cradle or to an arm or arms thereof. When the correctness of the filling of a container is being tested, the common center of gravity of the container and of the cradle may be located on the predetermined axis of rotation, if the container has been correctly filled, or said common center may be located directly above or directly below the axis of rotation. In said testing position the center of gravity of the container itself may be located on the axis of rotation, or directly vertically above or directly vertically below the axis of rotation, so that the weight of the container per se will exert no turning force. In said testing position the center of gravity of the empty container per se may be laterally offset relative to the axis of rotation, but this lateral offset is so slight as to eliminate any substantial inaccuracies which may result from differences in the weights of respective containers. Therefore, in making the test, the weight of the container exerts no turning moment, or substantially no turning moment, relative to said predetermined axis of rotation. The invention relates particularly to cans or other containers of symmetrical shape, in which the center of gravity of the container coincides with its geometrical center. However the invention applies to containers of irregular shape.

Another object of the invention is to cause the can or container to turn about an axis which is located below the center of mass of the can, under the moment of the filling material of the container, so that the container is moved sharply from a predetermined normal position to a second position, when the weight of the contents exceeds a predetermined limit.

Other objects of the invention will be set forth in the following description and drawings which illustrate several preferred embodiments thereof.

Figures 1, 2:
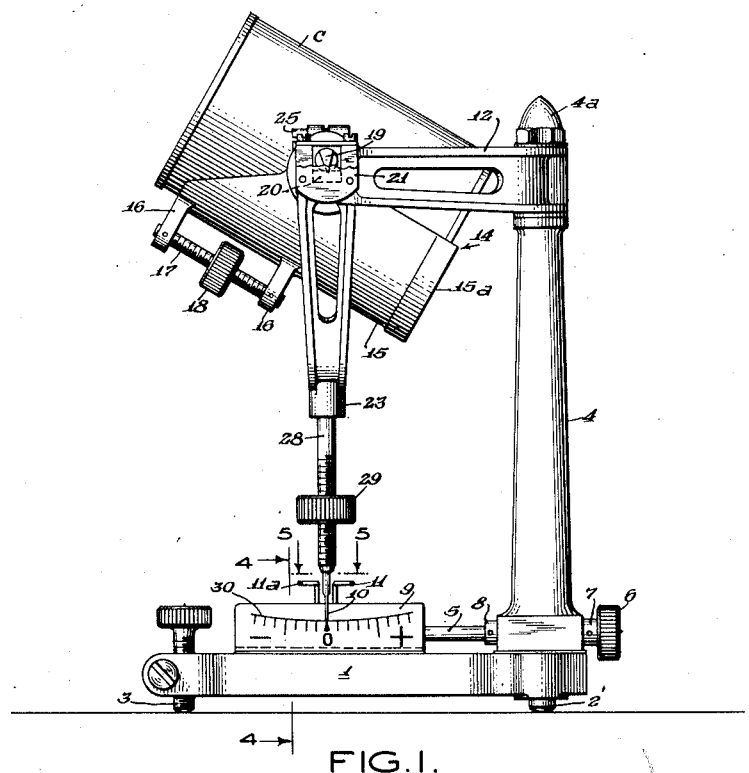
Fig. 1 is a side elevation of the first embodiment of the invention.
Fig. 2 is a top plan view of Fig. 1.
Figure 3:
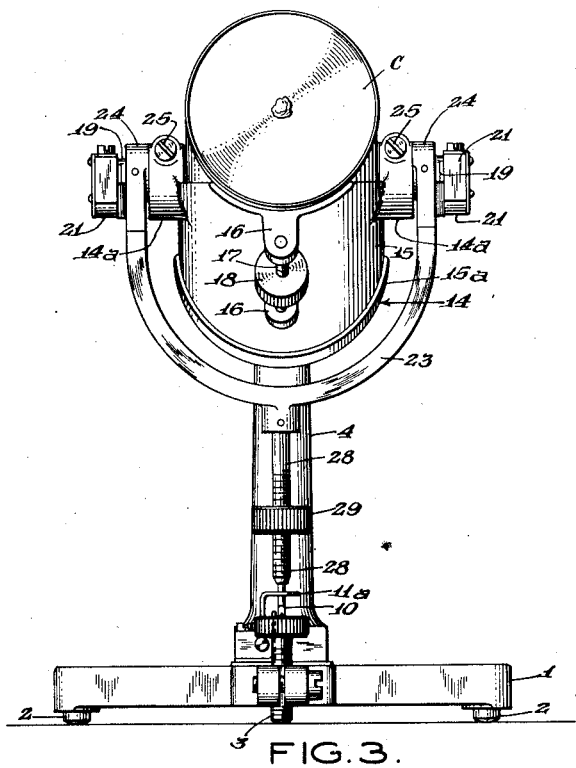
Fig. 3 is a front elevation taken at the left-hand side of Fig. 1.

In filling bottles, cans and other containers with liquid or solid material, it is necessary to perform the filling operation very accurately, as otherwise there is a waste of material. For many purposes, as in filling cans with unsweetened evaporated milk, the can is not completely filled, as complete filling would interfere with the processing of the milk in the can. In other cases, as for example in filling cans with sweetened evaporated milk, it is necessary to fill the can completely. Experience has shown that the valve regulation of filling machines is frequently inaccurate and that accurate adjustment of such valves cannot be maintained over long periods of time. It has therefore been the practice to check up the accuracy of the filling machine by weighing selected cans or other containers. However, the weights of respective cans or other containers may vary substantially, although such cans or other containers are made by the same machine and as uniformly as possible. For example, in making cans for packing evaporated or condensed milk, the weight of the sheet metal may vary. This variation in weight makes it even more difficult to determine whether the can has been accurately filled.

According to the first embodiment of my invention, the can is turnably supported so that the can can turn around an axis which passes through the center of gravity of the empty can. This axis of rotation is preferably horizontal. The effect of differences in the weights of respective cans is thus eliminated. While the weight of one can may differ substantially from the weight of another can, it can be assumed, for practical purposes, that the center of gravity of an empty can coincides with its center of volume, because the effect of differences in thickness of the wall of a can is insignificant. The same applies to bottles and containers which are made of glass or other materials, and it is to be understood that whenever I refer to a can, I include any type or shape of container, and I include containers which are made of any material.

According to another embodiment of my invention the filled can, which is wholly or partially filled, is tested while the common center of gravity of the filled can and of the cradle is higher than the horizontal axis of rotation of the cradle.

According to another embodiment of the invention, the can is supported so that its center of mass is offset laterally relative to the axis around which the can is mounted to turn. Said axis is preferably, but not necessarily, horizontal. The weight of the empty can thus exerts a moment on the can and its turnable support, and said moment can be counterbalanced by suitable biasing means. When the can is filled either partially or wholly, the weight of the filling material increases said turning moment. The turnable support of the can may be biased or balanced against said moment of the filling material so that the can will remain in a predetermined position until the weight of the filling material exceeds a predetermined limit. Whenever I refer to a filled can, I include a can or other container which has been filled either partially or wholly. In the last mentioned embodiment of the invention, the axis around which the can is mounted to turn may pass through the center of gravity of the can, or said axis of rotation may be located below the center of gravity of the can.

Figure 9:
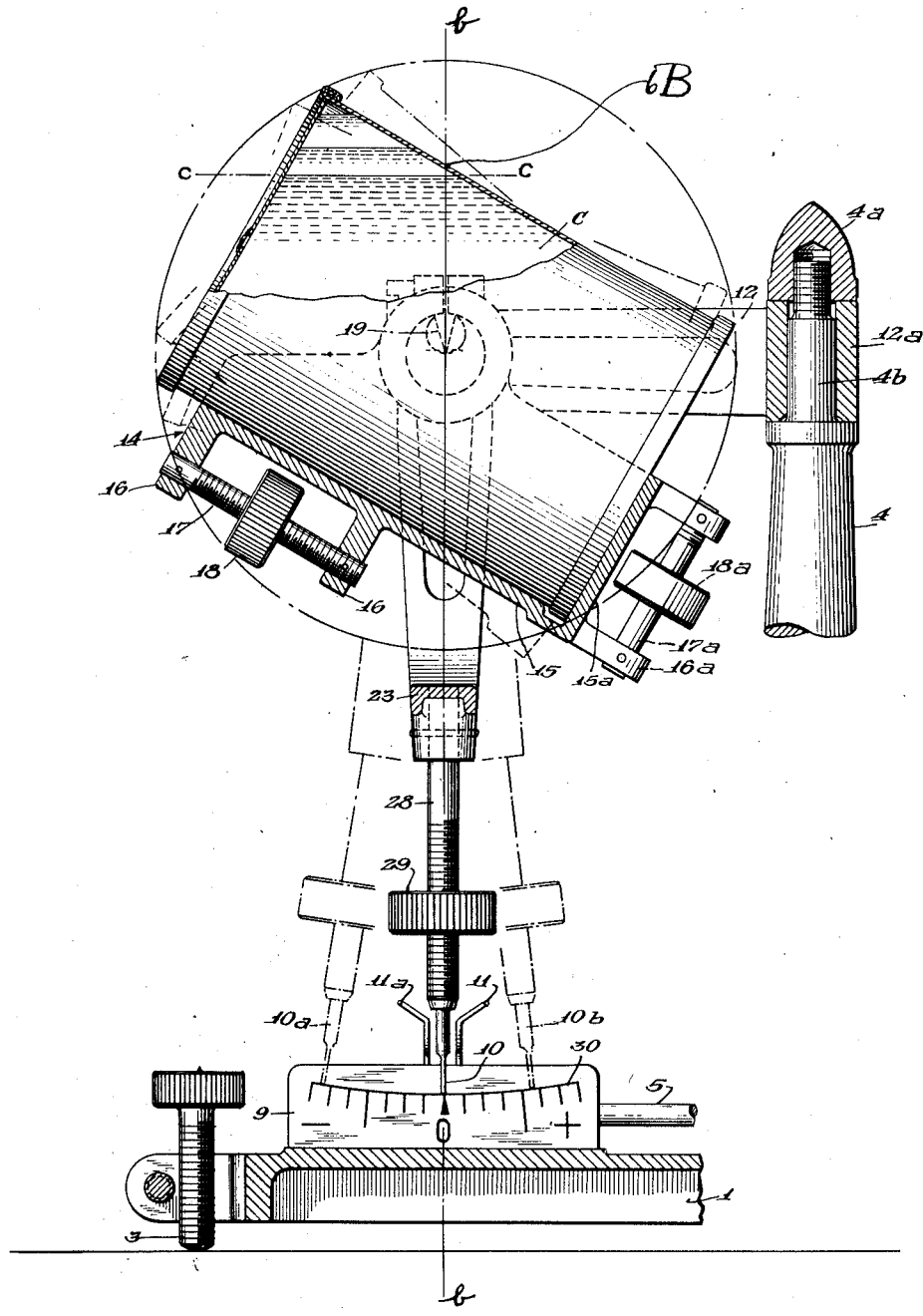
Fig. 9 is a side elevation, partially in section, showing a first modification.

The base 1 rests upon a pair of fixed studs 2 and upon a single adjustable screw 3, which is a leveling screw. A column 4 is connected to the base 1 or is integral therewith. The base 1 is leveled so that the column 4 is held vertical. As shown in Fig. 9, the arm 12 has a sleeve 12a in which a reduced upper end-portion 4b of the column 4 is located. The top reduced end-portion of the part 4b is threaded, and a clamping cap 4a is connected to said threaded end-portion. This cap 4a clamps sleeve 12a rigidly against a shoulder of the column 4. The arm 12 has the yoke shape which is shown in Fig. 2. At each end thereof the arm 12 has a depending yoke 21. Each yoke 21 is associated with a knife-edge member 19.

Figures 6, 7:
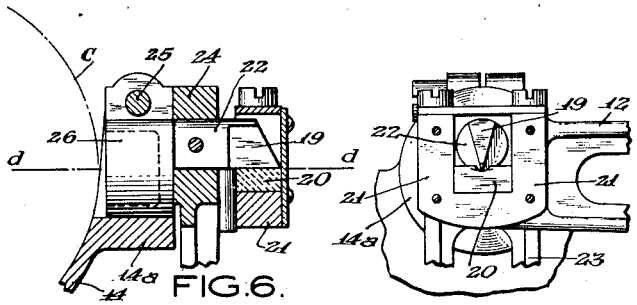
Fig. 6 is a section on 6—6 of Fig. 2.
Fig. 7 is an elevation on 7—7 of Fig. 2.
Figure 8:
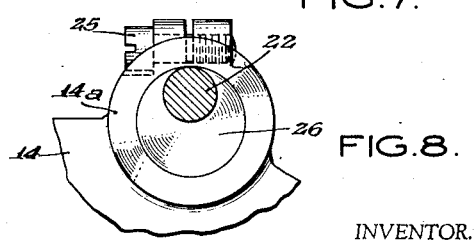
Fig. 8 is a section on 8—8 of Fig. 2.

As shown in Figs. 6 and 7, each knife-edge member 19 is integral with a pivot pin 22. The sharp edge of each knife-edge member 19 abuts the wall of a recess of a hardened steel insert 20, which is suitably connected to the respective yoke 21, by a drive fit or the like. A depending yoke-shaped arm 23 has hollow bosses 24, in which the pivot pins 22 are located. Said bosses 24 are rigidly connected by set screws or the like to the respective pivot pins 22. The cradle 14 has bosses 14a. These bosses are split bosses, and the ends of each boss 14a can be tightened by means of a tightening screw 25, so as to clamp said bosses 14a to the respective enlarged extensions 26 of the respective pivot pins 22. The longitudinal axis of each pivot pin 22 is offset relative to the longitudinal axis of its enlargement 26. The split bosses 14a and the tightening screws 25 make it possible to adjust the inclination of the longitudinal axis of the cradle, while the pointer 10 is maintained in the normal vertical position. The pointer rod 28 is connected to or it is integral with the arm 23. A part of the pointer rod 28 is threaded, and the weight 29 is adjustably mounted on said threaded portion. The pointer 10 of the pointer rod 28 is associated with a fixed scale 9. The cradle 14 and the arm 23 are thus supported on the sharp edges of the members 19, which are turnably supported on the inserts 20 of the depending yokes 21 of the arm 12.

Figure 4:
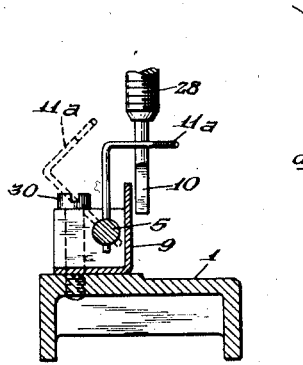
Fig. 4 is a section on 4—4 of Fig. 1.
Figure 5:
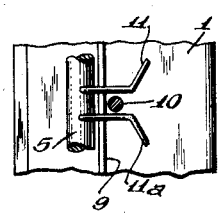
Fig. 5 is a section on 5—5 of Fig. 1.

As shown in Fig. 4, said scale 9 is of angular shape, and it is connected to the base 1 by means of screws 30. The shaft 5 is mounted turnably in a bore of the column 4, and it has the usual bearing collars 7 and 8. The shaft 5 is provided with a knob 6. The shaft 5 also has the angular stops 11 and 11a, which can hold the pointer 10 of the pointer rod 28 from moving, when said pointer is in its vertical position.

The leg 15 of the cradle 14 is provided with brackets 16, to which a threaded rod 17 is connected. The weight 18 is adjustable on the threaded rod 17.

The can C is located so that its geometrical center, which in this case coincides with the center of mass or center of gravity of said can, is located on the axis of rotation of the cradle 14, which is indicated by the line $d$—$d$ in Fig. 6. The sharp edges of both knife-edge members 19 coincide with this line $d$—$d$.

The embodiment of Fig. 9 is substantially the same as that of Figs. 1-8, save that in the embodiment of Fig. 9, the leg 15a of the cradle has brackets 16a, to which a threaded rod 17a is connected. The weight 18a is adjustably mounted on the threaded rod 17a. Fig. 9 shows a sealed can which has been correctly but partially filled, although this device can be used for determining whether a can has been completely filled. I will first consider the case in which it is desired partially to fill a can with a predetermined quantity of filling material. In such case, if pointer 10 is vertical, the level of the filling material may be represented by the line $c$—$c$ or by the horizontal line or plane which passes through the point 6B. The line $b$—$b$ is a vertical line which passes through the horizontal axis of rotation of the cradle. The center of gravity of the empty can is on the axis of rotation. If a can has been partially filled so that the level of the filling material is represented by the horizontal line or plane which passes through the point 6B, the weight 18, or the weights 18 and 18a are adjusted, so that the common center of gravity of the can and of the filling material and of the cradle is located on the vertical line $b$—$b$, if the can has been correctly filled. Said common center of gravity is located directly vertically below the axis of rotation. The vertical distance between said common center of gravity and said axis of rotation is regulated by adjusting the weight 29. After the apparatus has thus been adjusted, the test can is located on the cradle while the pointer 10 is held vertical by the stops 11 and 11a. If the test can has been underfilled, the common center of gravity of the can and of the filling material and of the cradle is located to the right of the vertical line $b$—$b$ so that when the stops 11 and 11a release the pointer 10, said pointer will turn towards the broken-line position indicated by 10a. If the test can has been overfilled, said center of gravity will be shifted to the left of the line b—b so that the pointer will swing towards the position indicated by 10b, when the stops release the pointer 10. The center of gravity of the cradle can be vertically adjusted by shifting the weight 29. If it is desired to test whether a can has been completely filled, a completely filled can is first located in the cradle. The weights 18 and 18a are then adjusted so that the common center of gravity of the empty can and of the filling material which completely fills the can, and of the cradle, is located vertically below the axis of rotation. The can which is to be tested is then placed on the cradle. If the test can has not been completely filled, the pointer 10 will swing towards the position 10a, when the stops are released.

Figure 10:
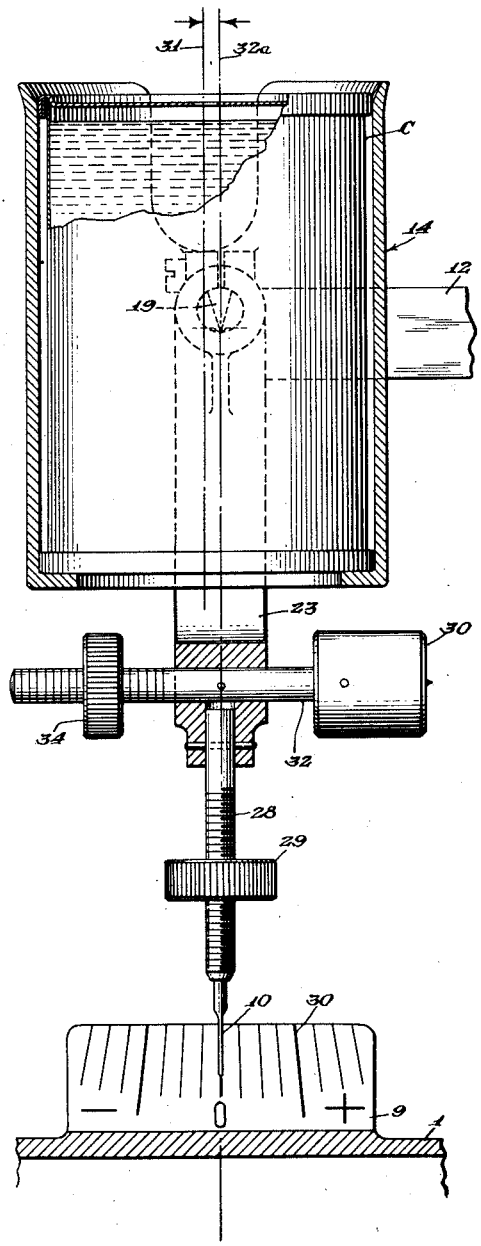
Fig. 10 is a side elevation, partially in section, showing a second modification.
Figure 12:
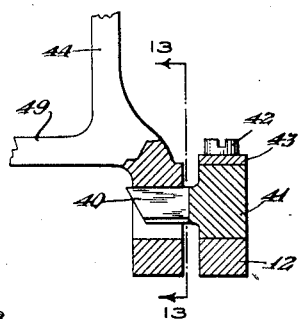
Fig. 12 is a sectional view, partially in elevation, on the line 12—12 of Fig. 11.

In Fig. 10, the longitudinal axis of the empty can, which passes through its center of gravity, is indicated by the line 31. When the can is in the testing position shown in Fig. 10, the center of gravity of the can is at the same level as the horizontal axis of rotation of the cradle. The axis of rotation of the cradle is located on the line 32a, which is offset laterally relative to the center of gravity of the can. Otherwise, the construction of the cradle is the same as that previously illustrated. The yoke 23 of the cradle is provided with a lateral arm 32 which has a fixed or adjustable weight 30 at one end thereof. The adjusting weight 34 can be longitudinally shifted on the rod 32.

The embodiment of Fig. 10 can also be used to test whether a can has been partially filled with the predetermined quantity of filling material, or whether the can has been completely filled. This test can be made prior to or after the can has been sealed. I will first take up the case in which the can is to be partially filled with a predetermined quantity of filling material. A can is filled with said predetermined quantity and it is located in the cradle. When the pointer 10 is held in the vertical position shown in Fig. 10, its vertical axis is represented by the line 32a which passes through the center of rotation of the cradle. The line 31 passes through the center of gravity of the empty can and also through the center of gravity of the filling material. When the pointer 10 is vertical, the top surface of the filling material is in a horizontal plane. The weight 34, or the weights 34 and 30 are then horizontally adjusted, so that the common center of gravity of the empty can and of the filling material and of the cradle is located on the line 32a. The lateral distance between the lines 31 and 32a is relatively small.

The adjusted clockwise moment of the cradle then balances the counterclockwise moment of the can and of its filling. Said adjusted clockwise moment of the cradle is designated as the balancing moment. I determine said balancing moment by making a test with a can or container which is one of a series of commercially similar cans or containers.

In the embodiment of Fig. 10, if the can under test has been underfilled, the balancing moment exceeds the moment of the filling in said narrow zone, and pointer 10 will turn clockwise. This is because the common centre of gravity of the underfilled can and of the cradle, is located at the right of line 32a.

In the embodiment of Fig. 10, if the can under test has been overfilled, the balancing moment is less than the moment of the filling in said narrow zone, and pointer 10 will turn counter-clockwise.

In the various embodiments, the longitudinal axis of the filled container is inclined to the horizontal and vertical planes, when the filled container is in stable equilibrium. The vertical distance between said common center of gravity and the axis of rotation is regulated by adjusting the weight 29. As an example, and without limiting the invention, the can which is to be tested may have a height of $3\frac{7}{8}$ inches, and a diameter of $2\frac{15}{16}$ inches and such can is to be filled with $14\frac{1}{2}$ ounces of unsweetened evaporated milk. In such case the lateral distance between the lines 31 and 32a should not exceed about $\frac{1}{8}$ inch. The variation in weight of the zone of the empty can which is located between the vertical planes which pass through the lines 31 and 32a is so slight as to eliminate any slight error which may thus arise. Hence the moment of the filling material greatly exceeds the moment of the can, and the moment of the filling material determines the direction in which the can turns in unison with the cradle, from the initial test position. Due to the adjustment of the apparatus, the filling material shifts the cradle from its initial test position, only if the volume of said filling material varies from a predetermined value. In order to test whether a can has been completely filled, using the embodiment of Fig. 10, a completely filled can is located in the cradle and the weight or weights of the cradle are then adjusted so that the common center of gravity of the can of the filling material whcih completely fills the same, and of the cradle, is located on the line 32a. If the can which is being tested is incompletely filled, said common center of gravity is located to the right of the line 32a and the pointer 10 will swing to the left.

The cradle will turn until the common center of gravity of the can and of its filling material and of the cradle will be located directly below the axis of rotation. The arc through which the cradle thus turns is regulated by regulating the vertical distance of the center of gravity of the cradle below the axis of rotation. The scales of Figs. 9 and 10 therefore give a direct reading of the difference between the predetermined filling of the can, either total filling or partial filling, and the filling of the can which is being tested.

In the third embodiment of Figs. 11-14, the arm 12 has the yoke shape of the first embodiment. Each knife-edge 40 is integral with a block 41, which is connected to the adjacent end of the arm 12 by screws 42, which pass through a clamping plate 43. The shank of each of the screws 42 engages a tapped bore of the arm 12. Each end of the arm 12 is provided with a U-shaped recess in which the respective block 41 is located and in which the respective block 41 is held by means of the respective clamping plate 43. The cradle 14 is associated with opposed arms 44 which have bosses 45. Pivot pins 46, which are integral with the cradle 14, pass through said bosses 45. Each pivot pin 46 is provided with an integral and rigid depending projection or lug 47. Each arm 44 is provided with a pair of adjusting screws 48 whose ends abut the respective projection or lug 47, in order to adjust the angular position of the cradle 14, relative to arms 44. The cradle can be turned relative to said arms 44, in order to make this adjustment. After the adjustment has been made, the cradle turns in unison with arms 44.

Figure 13:
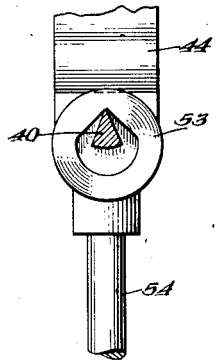
Fig. 13 is a sectional view, partially in elevation, on the line 13—13 of Fig. 12.

The screws 48 of each associated pair pass through respective tapped bosses of the respective arm 44. The arms 44 are provided with an integral cross-member 49. The central portion of this cross-member 49 is provided with a threaded rod 50, on which the weight 51 is mounted. The weight 52 is fixed or adjustably connected to said rod 50, which is fixed to the cross-member 49. Each arm 44 is provided with a hollow boss 53, whose shape is shown in Fig. 13. At the point of contact with the respective knife-edge member 40, each said boss 53 has a V-shape of greater angle than the angle of the knife edge 40. The depending rod 54 is connected to the central point of the cross arm 49. An angular holding plate 56 has a leg 58 thereof slidably located in the recess 57 of the base 1. The top leg of the plate 56 has a notch which holds the bottom end of the pointer rod 54 against movement. A compression spring 59 holds the plate 56 in operative position. The plate 56 can be slid out of said operative position by means of a rod 60, whose shank is connected to the leg 58. When the rod 60 is pushed inwardly, this releases the member 54. The cradle will then swing either clockwise or counterclockwise, depending upon the filling of the test can, until the bottom end of the member 54 abuts one of the stops 61 and 62.

Figure 11:
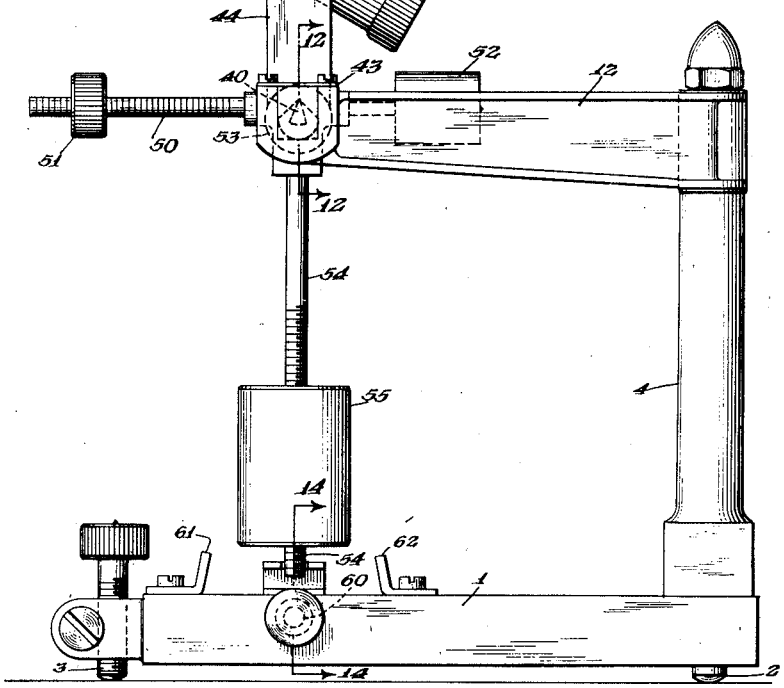
Fig. 11 is a side elevation of a third modification.
Figure 14:
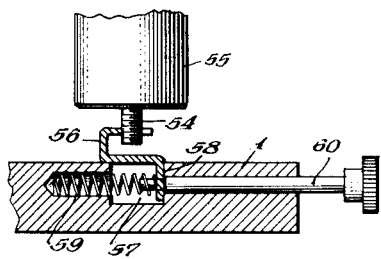
Fig. 14 is a sectional view, partially in elevation, on the line 14—14 of Fig. 11.

In the embodiment of Fig. 11, the common center of gravity of a correctly filled can and of the cradle is located on the longitudinal axis of the rod 54, when said rod is in the vertical position shown in said figure. This is the initial test position of the device. Said longitudinal axis of rod 54 then passes through the axis of rotation. The common center of gravity of the cradle and of the correctly filled can is then preferably directly vertically above the axis of rotation.

The vertical position of the common center of gravity of the cradle and of the correctly filled can, when the cradle is in the test position shown in Fig. 11, is regulated by the vertical adjustment of the weight 55. The common center of gravity of the correctly filled can and of the cradle can therefore be located on the horizontal axis of rotation of the cradle, or said common center of gravity can be located directly vertically above or directly vertically below said axis of rotation. If it is desired to test cans which have been partially filled, a can which has been filled with the correct amount of milk or other filling material is located in the cradle 14, while said cradle is in the position shown in Fig. 11. The rod 50 is then horizontal. The weight 51 of the cradle is then adjusted until the common center of gravity of the cradle and of the correctly and partially filled can is preferably located directly vertically above the axis of rotation of the cradle. The center of gravity of the empty can is then located directly vertically above the axis of rotation of the cradle. If the common center of gravity of the correctly and partially filled can and of the cradle is thus located above the axis of rotation of the cradle, the cradle and the partially filled can are then in unstable equilibrium. If the weight 55 is adjusted vertically so that the common center of gravity of the cradle and of the filled can is then located slightly below the axis of rotation of the cradle, the cradle is very sensitively balanced in stable equilibrium, and the weight of the empty can then exerts no turning moment on the cradle.

After the device has thus been adjusted, a partially filled can which is to be tested is located in the cradle 14, the center of gravity of the empty can being thus located vertically directly above the axis of rotation of the cradle. If the test can has been underfilled, the rod 54 will turn clockwise when the holding plate 56 is moved to its inoperative position. If the can has been overfilled, the rod 54 will be turned counterclockwise. By originally adjusting the device so that the common center of gravity of a correctly filled can and of the cradle is located only slightly below the axis of rotation, the incorrect filling of a can will cause the equilibrium of the system to be changed from the stable condition to the unstable condition. By originally adjusting the device so that the common center of gravity of the correctly filled can and of the cradle is located subsantially below the axis of rotation, the device will remain in stable equilibrium under normal conditions of underfilling or overfilling, so that the tip of the rod 54 can serve as a pointer, in combination with a scale of the type which is shown in Fig. 9.

Save when otherwise specifically stated, a reference to a filled container in the claims includes a partially filled container and also a completely filled container.

In each of the embodiments described herein, where gravity is the sole biasing force, the filling of the container is tested by causing the container to turn relative to an axis which is located in a vertical plane which intersects the wall of the container, in the initial test position of the device. Said vertical plane either passes through the center of gravity of the empty can when the device is in the initial testing position or else the lateral offset of said vertical plane relative to the center of gravity of the can, in said test position of the device, is so slight as to eliminate any substantial inaccuracies which result from the differences in the weights of respective cans.

Preferably, the center of gravity of the empty container is located in the vertical plane which passes through the axis of rotation so as to eliminate the effect of differences in the weights of respective containers. Said plane intersects the wall of the container. Said plane also includes the right-hand point of the line of intersection between the top surface of the filling material and the wall of the container, when the container is correctly and incompletely filled. This is the preferred and the most sensitive position of the cradle and of the can.

I have shown numerous preferred embodiments of my invention, but it is clear that numerous changes and omissions can be made without departing from its spirit.

I claim:

1. A method of testing the weight of a shiftable filling which is located in a container which is selected from a commercially similar series of such containers, which consists in filling a selected container of such series with a predetermined mass of such filling, mounting said selected filled container so that it can turn around a predetermined axis, applying to said filled container a balancing moment which balances the moment of said filled container when it contains said predetermined mass of filling, then locating another filled container of said series in the same position as said selected filled container, applying to said other filled container the same aforesaid balancing moment, and determining the relation between the moment of said other filled container and said balancing moment, said axis of rotation being located in a vertical plane which intersects the wall of the respective container in all positions thereof while said container is so mounted, the maximum horizontal distance between the centre of gravity of the respective container and said predetermined axis, when the respective container is so mounted, being sufficiently small so that variations in the respective weights of the respective containers are negligible, and the differences between the respective moments of respective containers which are so mounted, are due substantially to differences in the masses of the respective fillings of the respective containers, each said filled container having its axis inclined to the horizontal and vertical planes when it is in stable equilibrium.

2. A method of testing the weight of a shiftable filling which is located in a container which is selected from a commercially similar series of such containers, which consists in filling a selected container of such series with a predetermined mass of such filling, mounting said selected filled container so that it can turn around a predetermined axis and with the centre of gravity of said container substantially coincident with said axis, and applying to said selected filled container a balancing moment which balances the moment of said selected filled container when it contains said predetermined mass of filling, then locating another filled container of said series in the aforesaid position and applying the aforesaid balancing moment thereto and determining the relation between the moment of said other filled container and said balancing moment, the longitudinal axis of each said filled container being inclined to the horizontal and vertical planes when it is in stable equilibrium.

3. In the art of determining the weight of the shiftable filling of a container which has a longitudinal axis, that method which consists in holding said container so that it can turn around a predetermined axis with which the centre of gravity of said container is substantially coincident to a position of stable equilibrium in which said longitudinal axis is inclined to the horizontal and vertical planes, and determining the value of the moment which is required to balance the moment of said filled container around said axis.

HARRY L. GRIFFIN.